(12) United States Patent
Yadid-Pecht

(10) Patent No.: US 6,831,689 B2
(45) Date of Patent: Dec. 14, 2004

(54) OPTICAL IMAGER USING A METHOD FOR ADAPTIVE REAL-TIME EXPANDING OF THE DYNAMIC RANGE

(75) Inventor: Orly Yadid-Pecht, Haifa (IL)

(73) Assignee: Orly Yadid-Pecht (IL)

( * ) Notice: Subject to any disclaimer, the term of this patent is extended or adjusted under 35 U.S.C. 154(b) by 751 days.

(21) Appl. No.: 09/837,525

(22) Filed: Apr. 18, 2001

(65) Prior Publication Data

US 2002/0027606 A1 Mar. 7, 2002

Related U.S. Application Data

(63) Continuation of application No. PCT/IL99/00532, filed on Oct. 7, 1999.

(51) Int. Cl.[7] .............................. H04N 3/14; H04N 5/335
(52) U.S. Cl. ...................... 348/297; 348/294; 348/362; 348/222.1
(58) Field of Search .................... 348/222.1, 229.1, 348/230.1, 294, 297, 302, 308, 362

(56) References Cited

U.S. PATENT DOCUMENTS 4,706,123 A * 11/1987 Chautemps ................. 348/297
5,748,303 A    5/1998 Korta et al.
6,248,990 B1 * 6/2001 Pyyhtia et al. ............ 250/208.1
6,665,010 B1 * 12/2003 Morris et al. ............... 348/297

FOREIGN PATENT DOCUMENTS

| DE | 196 44 479 | 5/1998 |
|---|---|---|
| IL | 100620 | 1/1992 |
| WO | 90/01844 | 2/1990 |
| WO | 93/14595 | 7/1993 |
| WO | 97/17800 | 5/1997 |
| WO | 98/14002 | 4/1998 |

* cited by examiner

Primary Examiner—Andrew Christensen
Assistant Examiner—Brian Genco
(74) Attorney, Agent, or Firm—Lerner, David, Littenberg, Krumholz & Mentlik, LLP

(57) ABSTRACT

Method and apparatus for expanding the dynamic range of an optical imager, comprising individually controlling the integration time of each pixel of a sensor array, and providing a corresponding scaling factor for the electrical output of each individual pixel during the frame time. The integration time of each pixel is controlled as a function of light intensity received by each individual pixel, by resetting the pixel after a predetermined threshold for the output signal, has been reached.

44 Claims, 3 Drawing Sheets

OPTICAL IMAGER USING A METHOD FOR ADAPTIVE REAL-TIME EXPANDING OF THE DYNAMIC RANGE

CROSS-REFERENCE TO RELATED APPLICATIONS

The present applications is a continuation of International Application No. PCT/IL99/00532.

FIELD OF THE INVENTION

The present invention relates to the field of optical imagers. More particularly, the invention relates to a method for adaptively expanding the dynamic range of optical active pixel sensors, by using on-chip, real-time automatic scaling of each pixel.

BACKGROUND OF THE INVENTION

Optical imagers (sensors) are widely used in many imaging applications, such as metrology, avionics and space, and particularly as light sensing devices in electronic cameras. Charge Coupled Devices (CCDs) are widely used in optical imagers, and have 65 to 75 dB dynamic range. However, CCDs require special processing, and also lack itegrability. An emerging technology is currently exploited for manufacturing Metal Oxide Semiconductor (CMOS) Active Pixel Sensors (APS), which consume less power and are potentially of lower cost and high integrability.

A typical Active Pixel Sensor (APS) consists of an array of active pixels, each active pixel containing a light sensing element (e.g., a photo-diode or a photo-transistor) and one or more transistors to buffer and amplify the electric signals generated by the light sensing element, in response to light exposure.

Basically, optical imagers may be exposed to a wide range of illumination levels when imaging scenes. Night vision usually introduces illumination levels starting from $10^{-3}$ lux, whereas indoor lighting ranges between $10^2$ and $10^3$ lux, and sunlight may reach $10^5$ lux. This wide range requires a wide dynamic range from the sensors employed.

The dynamic range of a pixel is defined as $20*\log(S/N)$, where S and N are the saturation level of the pixel, and the noise floor, respectively. Low dynamic range entails saturation of pixels with high sensitivity, in case of high illumination levels, or high noise levels, of pixels with lower sensitivity. In both cases, part of the information is lost. Typical dynamic ranges of an APS also range between 65 to 75 dB.

An important factor affecting the dynamic range is the pixel integration time (the time lapses between reset and sample signal), during which the pixel is exposed to illumination and outputs a corresponding electric signal. Basically, a relatively long integration time is required for low illumination levels, so as to obtain a signal which is well beyond the noise floor. On the other hand, a relatively short integration time is required for high illumination levels, so as to eliminate saturation.

Several known methods are used for widening the dynamic range of an APS, which fall into three basic categories: compressing the pixel response curve, clipping the pixel response curve and controlling the pixel integration time. The first two are less advantageous, since they result in loss of information. The latter is preferred, and can be done either globally or locally.

Israeli Patent 100620 describes a method for increasing the dynamic range of optical sensors by conditionally applying a chain of reset signals, within the frame time. A control circuit, which may be common to a group of pixels, compares the illumination levels to a threshold level, which indicates impending saturation, and enables a reset signal after the threshold has been reached. The number of resets during the frame time is counted, and used to calculate a scaling factor, by which the output electric signal is multiplied. However, the circuitry which is required to carry out the comparisons at different time points, which is described in this patent, occupies relatively large area. Hence, the fill-factor (which is the ratio between the pixel area which is responsive to light, and the total pixel area) of the imager is reduced, causing a deterioration in the resolution of the imager.

WO 97/17800 describes an imaging device, comprising an array of pixels having two sampling capacitor banks. Each row is sampled and copied to each capacitor bank twice, first for the short integration time and second, for the long integration time, thereby widening the dynamic range. However, this method is advantageous only if the actual illumination level matches one of these integration times. Any illumination level that falls in between, results in a loss of information. Furthermore, storing the outputs for additional integration times requires more memory cells, which occupy more space, thereby reducing the Field Of View (FOV).

All the methods described above have not yet provided satisfactory solutions to the task of expanding the dynamic range of optical imagers, in real time, and without losing information.

It is an object of the present invention to provide a method and apparatus for expanding the dynamic range of optical imagers, which overcome the drawbacks of prior art imagers.

It is another object of the invention to provide a method for expanding the dynamic range of optical imagers, in real time and during the frame time.

It is still another object of the invention to provide a method for expanding the dynamic range of optical imagers, without losing temporal resolution of the imager, and with minimal effect on spatial resolution.

It is yet another object of the invention to provide a method for expanding the dynamic range of optical imagers, that matches any illumination level.

Other purposes and advantages of the invention will appear as the description proceeds.

SUMMARY OF THE INVENTION

The invention is directed to a method for expanding the dynamic range of an optical imager by individually controlling the integration time of each pixel of a sensor array, and providing a corresponding scaling factor for the electrical output of each individual pixel during the frame time. The integration time of each pixel is controlled as a function of light intensity received thereon, by resetting the pixel after a predetermined threshold for the output signal has been reached. The imager is constructed from a two dimensional active pixel array of M (integer) columns and N (integer) rows, fabricated on a semiconductor substrate. Each individual pixel contains an optical sensor to receive light, a reset input and an electrical output representing the illumination received thereon. The outputs of a selected row are copied into an upper column-parallel signal chain of M capacitors and compared to a set of corresponding threshold values, and into a lower column-parallel signal chain of M capacitors for readout. Preferably, the electrical readout of each pixel is output as an analog signal, or converted to a digital representation. The comparison results are stored in a digital memory. A control circuit controls the reading operations of each pixel, the timing of comparisons for each pixel, and provides corresponding reset signals for each pixel. The required expansion of the dynamic range is determined by a series of W bits, and comparisons are carried out at W time points, having prefixed intervals. Preferably, these time points are selected according to the downgoing series $$T - \frac{T}{U^1}, T - \frac{T}{U^2}, \ldots, T - \frac{T}{U^W},$$

wherein U>1 and T represents the full integration time. Time and space are multiplexed by matching between each time point and a row which is shifted from a selected row n, which is selected for comparison, by a prefixed number of rows. Preferably, row shifts are selected according to the integer values of the downgoing series $$n - \frac{N}{U^1}, n - \frac{N}{U^2}, \ldots, n - \frac{N}{U^W}.$$

Preferably, U is selected to be 2, so as to simplify the matching between $$T - \frac{T}{2^1}, T - \frac{T}{2^2}, \ldots, T - \frac{T}{2^W}$$

and $$n - \frac{N}{2^1}, n - \frac{N}{2^2}, \ldots, n - \frac{N}{2^W},$$

required for time-space multiplexing. Preferably, the downgoing series of row shifts may be also selected as the integer values of the series $$\frac{N}{X_1}, \frac{N}{X_2}, \ldots, \frac{N}{X_W}$$

where $X_i$>1 and i=1, 2, . . . , W. Preferably, the downgoing series of time points may be $$T - \frac{T}{X_1}, T - \frac{T}{X_2}, \ldots, T - \frac{T}{X_W}.$$

The comparison results are stored in a memory, and a reset pulse is applied for those pixels that are expected to be saturated, only if that pixel was reset in the preceding comparison time point. The scaling factor for each pixel, which is stored in the memory as a series of W bits digital combination, or as an encoded combination of said W bits, is output at real time together with the analog or digital un-scaled electrical output value of the pixel. The electrical output value of each pixel may be represented as a floating point representation, where the mantissa represents the regular value, obtained from the pixel's analog to digital converter and the exponent representing the scaling factor.

The control circuit receives the comparison results from the decision buffer and provides the drive signal for the reset operation of each pixel. The control circuit also generates a series of reset pulses of constant predetermined frequency and duty cycle, so as to terminate the integration time. A series of sampling pulses of predetermined duty cycle and of the same frequency of the reset pulses, is generated. This series appears with a constant delay with respect to the reset pulses. The time interval between consecutive sampling pulses represents the full integration time. A series of reset enable pulses is generated, in which the time interval between consecutive pulses is shorter than the time interval between consecutive reset pulses. A control signal is generated whenever the electrical output of a pixel exceeds the threshold value. A conditional reset signal is generated whenever there is coincidence between a reset enable pulse and a control signal, and integration is started at the time of generation of either a reset pulse or a conditional reset pulse. The integration is terminated at the time of sampling pulse generation.

Preferably, the control and memory circuits are fabricated on the imager semiconductor substrate, for simplicity, speed, Signal-to-Noise Ratio (SNR) and cost reduction. The imager may comprise only one column-parallel signal chain of capacitors with associated A/D converter, which is used both for copying readouts for comparisons with threshold values, and for copying the electrical readouts of each selected row.

The invention is also directed to an optical imager with expanded dynamic range, which comprises circuitry for individually controlling the integration time of each pixel of the sensor array, and for providing a corresponding scaling factor for the electrical output of each said individual pixel during the frame time. This circuitry of the imager controls the integration time of each pixel as a function of light intensity received thereon by resetting the pixel after a predetermined threshold for the output signal has been reached.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

Figure 1:
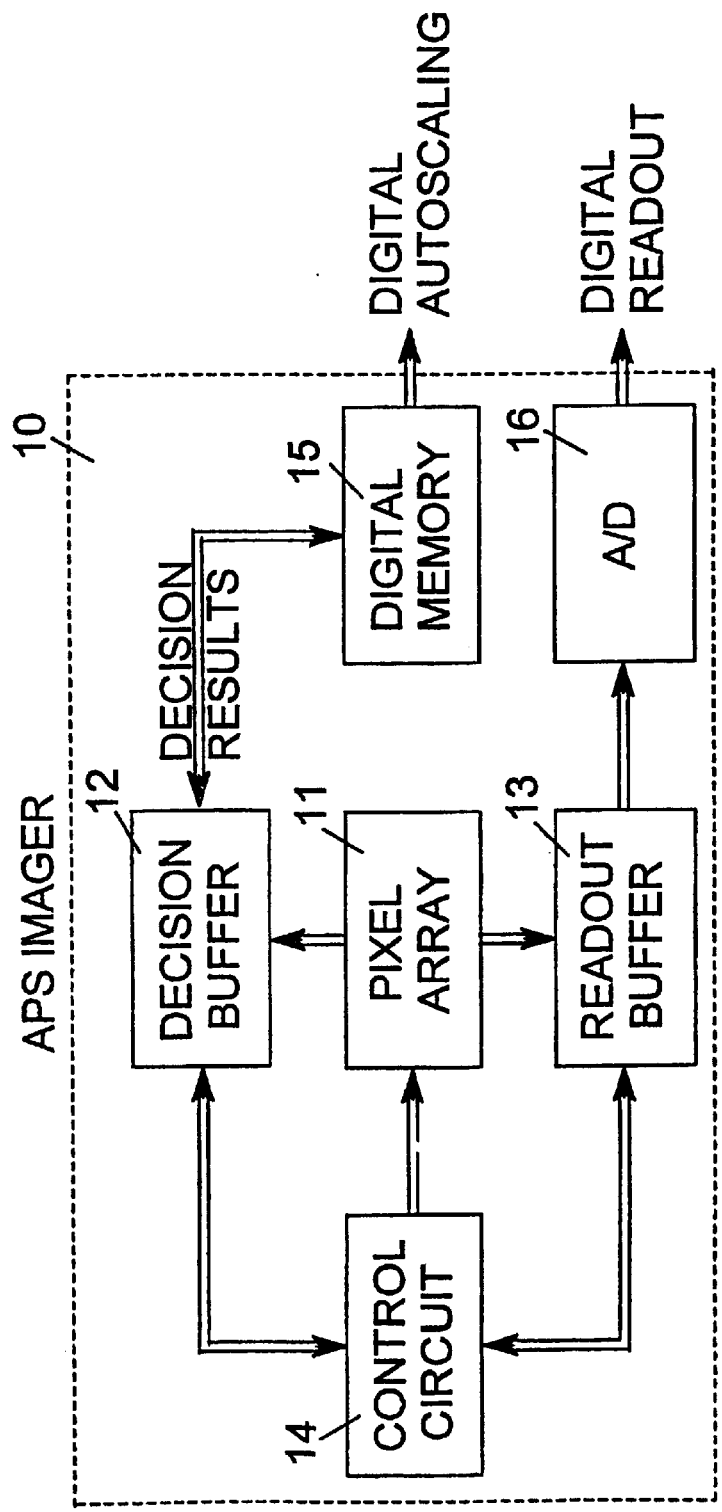
FIG. 1 is a block diagram of an imager with memory and control circuitry, according to a preferred embodiment of the invention.

With reference to prior-art problems, the present invention provides a method for expanding the dynamic range of an optical imager, by individually controlling the integration time of each pixel, adaptively, during the fame time, with minimal effect on spatial resolution of the imager. This requires individual reset capability for each pixel, as well as memory means to store several electrical outputs and control circuitry to control the reset operations. FIG. 1 is a block diagram of an imager with such memory and control circuitry, according to a preferred embodiment of the invention. An APS imager 10, consists of a pixel array 11, of N rows and M columns, each pixel from the array having individual reset capability, a readout analog column parallel signal chain (of M capacitors) buffer 13, a column parallel signal chain (of M capacitors) decision buffer 12, a control circuit 14, a digital memory 15 and an (optional) Analog to Digital Converter (A/D) 16, is fabricated on a semiconductor substrate. Usually, the array is constructed such that M and N are integer powers of 2 (e.g., $M=2^{10}$), and in some cases the array has a square matrix structure, where M=N.

The control circuit 14, is used to select a row from the pixel array 11, for readout and for (potential) reset, and to control the timing at which a (potential) reset is carried out. For each pixel from a selected row, the decision buffer 12, provides an indication whether the pixel is exposed to an illumination level which is close to saturation, according to a comparison of the electrical output signal of the pixel, to a predetermined threshold (which may not necessarily indicate actual saturation). If the illumination level approaches saturation (or a predetermined threshold), the decision buffer 12 outputs a corresponding signal to the control circuit 14, which, in turn, resets the pixel by delivering a corresponding reset signal to its reset input. At the same time, the decision buffer 12 also outputs a digital signal (usually "1" or "0" logic), indicating the comparison result (i.e., the decision whether a reset is required) into the digital memory 15, which stores and accumulates comparison results, as a series of corresponding bits for each pixel. The M electric signals provided by each pixel of the selected row, are copied, according to a command from the control circuit 14, into the readout buffer 13, and then converted to M corresponding digital words by an array of M Analog to Digital Converters (A/D). Each digital binary value (a combination of bits which corresponds to the comparison results) is stored in the digital memory 15, and used as an accurate scaling factor for the readout word. According to a preferred embodiment of the invention, the whole APS imager 10, may be fabricated on the same semiconductor substrate, so as to save space and eliminate the need for assembly. Alternatively, the control circuit 14, and the digital memory 15 may be external.

The control circuit receives the comparison results from the decision buffer and provides the drive signal for the reset operation of each pixel. The control circuit also generates a series of reset pulses of constant predetermined frequency and duty cycle, so as to terminate the integration time. A series of sampling pulses of predetermined duty cycle and of the same frequency of the reset pulses is also generated, with a constant predetermined delay with respect to the reset pulses. The time interval between consecutive sampling pulses represents the full integration time. A series of reset enable pulses of time interval between consecutive pulses shorter than the time interval between consecutive reset pulses is also generated. A control signal is generated, whenever the electrical output of a pixel exceeds the threshold value. A conditional reset signal is generated whenever there is coincidence between a reset enable pulse and a control signal. Integration starts at the time point of generation of either a reset pulse or a conditional reset pulse, and is terminated at the time of sampling pulse generation. Thus, saturation of the pixel is changed whenever the illumination level exceeds the threshold value.

According to a preferred embodiment of the invention, the output of each pixel is checked and compared to a predetermined threshold value, during the frame time T (i.e., the time required to read N rows), at several time points, which are selected according to the desired expansion of the dynamic range. Basically, the factor of expansion is given by the ratio between the longest possible integration time $T_{intL}$ (i.e., the frame time T) and the shortest integration time $T_{intS}$. The expanded dynamic range $D_2$, expressed in dB, is given by:

$$D_2[\text{dB}] = D_1[\text{dB}] + \log\frac{T_{intL}}{T_{intS}} \quad [\text{Eq. 1}]$$

wherein $D_1$ is the dynamic range expressed in dB before expansion, Equivalently, the expansion may be expressed digitally by bits, and is given by:

$$D_2[\text{bits}] = D_1[\text{bits}] + \log_2\frac{T_{intL}}{T_{intS}} \quad [\text{Eq. 2}]$$

For example, 3 additional bits are required to expand the dynamic range by a factor of $2^3=8$.

According to a preferred embodiment of the invention, after selecting a desired expansion factor of W bits, the time points at which each row (and, thus, each pixel) outputs are compared to a set of predetermined threshold values, are determined. The intervals between any two consecutive time points may be equal or different, and may form various sets of values, such as, a geometric or arithmetic series. Generally, the series of time points are of the form $$t = T - \frac{T}{X_1}, T - \frac{T}{X_2}, \ldots, T - \frac{T}{X_W},$$

wherein T is the frame time (full integration time), $X_i>1$ and i=1, 2, ..., W.

In a preferred embodiment, the time points are selected according to the down-going geometric series:

$$t = T - \frac{T}{U^1}, T - \frac{T}{U^2}, \ldots, T - \frac{T}{U^W} \quad [\text{Eq. 3}]$$

wherein U>1. Thus, W comparisons (at W different time points) are carried out during the frame time, whereas the time interval between two consecutive comparisons is shortened as time lapses, so as to reliably detect an impending pixel saturation. According to a preferred embodiment of the invention, a value of U=2 is selected for simplicity, resulting in the down-going series:

$$t = T - \frac{T}{2^1}, T - \frac{T}{2^2}, \ldots, T - \frac{T}{2^W}.$$

Figure 2:
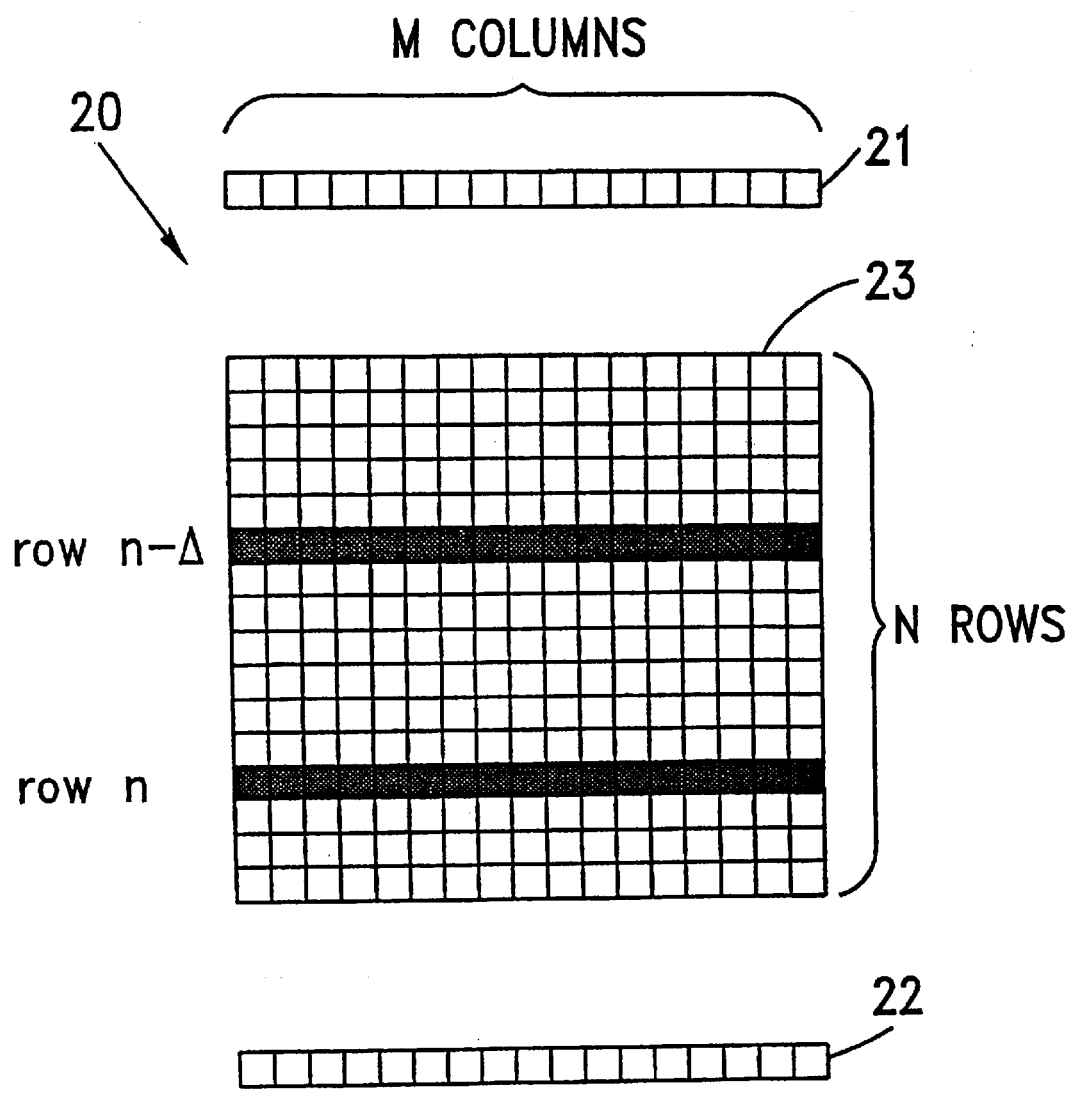
FIG. 2 illustrates an active pixel sensor with two column parallel buffers, according to a preferred embodiment of the invention.
Figure 3:
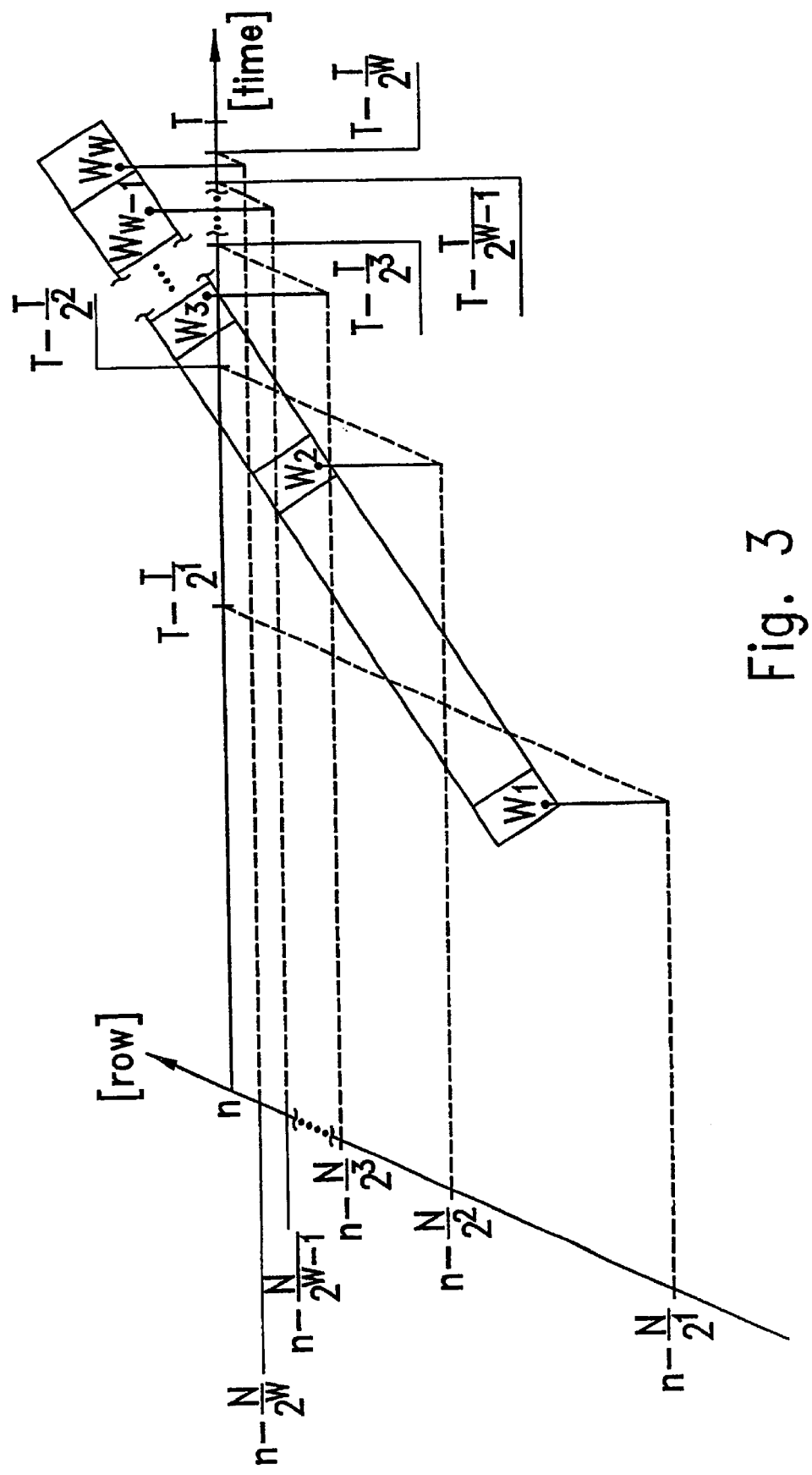
FIG. 3 illustrates the time-space multiplexing exploited, according to a preferred embodiment of the invention.

Since rows are read consecutively according to a "rolling shutter" operation (i.e., each row is selected for readout and reset after the readout, the full frame time is the time lapses until the next readout, which is carried out after reading N rows and so forth), looking at time, the frame time of each row has a slightly different starting point, resulting from the time period required for scanning all M pixels in each row and copying the results to a buffer. According to a preferred embodiment of the invention, this difference in time is exploited for multiplexing between time and space, so as to carry out W comparisons for each pixel (row), at W different time points, essentially without extending the original frame time T. FIGS. 2 and 3 illustrate this multiplexing between time and spatial domains.

Referring first to FIG. 2, an imager 20, which consists of a pixel array 23, of N rows and M columns, a readout analog column parallel buffer 22, and a decision buffer 21, is illustrated. At time t=0, a row n is selected for regular readout, copied into buffer 22 and reset. Immediately following, another row, n–Δ, shifted by Δ rows, is selected and copied into the decision buffer 21, for comparison of each pixel with its corresponding threshold. For each pixel, the result of the comparison is provided as a digital value. At each time point, if the threshold for a certain pixel has been reached (indicating a relatively high intensity which may cause saturation), the result for this comparison is a "1" logic. On the other hand, if the threshold for a certain pixel is not reached (indicating a relatively low intensity, far from saturation), the result for this comparison is a "0" logic. These bits are stored for each pixel at each time point (at each comparison).

Of course, it is possible to switch between the functions of buffers 21 and 22. According to a preferred embodiment of the invention, only one buffer may be used both for copying regular readouts of each row, and for copying the electric signals of each pixel for comparisons to threshold levels. Thus, space is saved, with some effect on the frame time.

According to a preferred embodiment of the invention, Δ is selected to have W different prefixed integer values ($\Delta_1, \Delta_2, \ldots, \Delta_W$). These values may be selected according to the integer values of the series $$\frac{N}{X_1}, \frac{N}{X_2}, \ldots, \frac{N}{X_W}$$

wherein $X_i > 1$ and $i = 1, 2, \ldots, W$. Therefore, comparisons for the series of rows $$n - \frac{N}{X_1}, n - \frac{N}{X_2}, \ldots, n - \frac{N}{X_W}$$

are carried out at $$T - \frac{T}{X_1}, T - \frac{T}{X_2}, \ldots, T - \frac{T}{X_W},$$

respectively, providing the desired time-space multiplexing.

An efficient selection of ($\Delta_1, \Delta_2, \ldots, \Delta_W$) is carried out according to the integer values of the down-going geometric series $$\frac{N}{U^1}, \frac{N}{U^2}, \ldots, \frac{N}{U^W}$$

wherein U>1, and for each row n that is selected for readout, W associated rows are selected (for comparison to corresponding thresholds) consecutively, according to the integer values of the down-going series:

$$n = n - \frac{N}{U^1}, n - \frac{N}{U^2}, \ldots, n - \frac{N}{U^W} \quad [\text{Eq. 4}]$$

which matches the time domain down-going geometric series:

$$t = T - \frac{T}{U^1}, T - \frac{T}{U^2}, \ldots, T - \frac{T}{U^W}$$

of Eq. 3 above.

Thus, at every time when a row is selected for readout, W comparisons are carried out for other rows, at W matching time points, providing the desired time-space multiplexing.

According to a preferred embodiment of the invention, Δ is selected to have W different values, $$\frac{N}{2^1}, \frac{N}{2^2}, \ldots, \frac{N}{2^W},$$

which are a power of 2 (i.e., U=2), and for each row n that is selected for readout, W associated rows are selected (for comparison to corresponding thresholds) consecutively, according to the down-going series:

$$n = n - \frac{N}{2^1}, n - \frac{N}{2^2}, \ldots, n - \frac{N}{2^W}$$

which matches the time domain down-going series:

$$t = T - \frac{T}{2^1}, T - \frac{T}{2^2}, \ldots, T - \frac{T}{2^W}.$$

By selecting U=2, the implementation may be simplified.

FIG. 3 illustrates this time-space multiplexing, according to a preferred embodiment of the invention. At t=0, a row n is selected for readout. Consequently, row $$n - \frac{N}{2^1}$$

is selected, for which the first comparison result with the corresponding threshold is $W_1$, at the time point $$T - \frac{T}{2^1}.$$

This row, $$n - \frac{N}{2^1} \left( \text{which is shifted from row } n \text{ by } \Delta = \frac{N}{2} \right),$$

will be selected again for readout $$\frac{N}{2}$$

rows from the first comparison ($W_1$) timing, leaving an integration time of $$\frac{T}{2}.$$

Immediately after, row $$n - \frac{N}{2^2}$$

is selected for comparison, for which the second comparison result with the corresponding threshold is $W_2$, at the time point $$T - \frac{T}{2^2}.$$

This row, $$n - \frac{N}{2^2} \text{ (which is shifted from row } n \text{ by } \Delta = \frac{N}{4}\text{)},$$

will be selected again for readout $$\frac{N}{4}$$

rows from the first comparison ($W_2$) timing, leaving an integration time of $$\frac{T}{4}.$$

This process is repeated W times, resulting in a W bit digital combination (=$W_1, W_2, \ldots, W_W$) for every pixel, during the frame time. Thus, the actual readout of every pixel at t=0, is autoscaled by the value of the digital combination. At each time point, except that of the first one $$T - \frac{T}{2^1},$$

the comparison result of the preceding time point is checked before resetting that point The current time point is reset only if the preceding time point has been reset before, because of the fact that if no preceding reset has been carried out, the pixel may still be within the linear dynamic range, even though its output is higher than the reset threshold level.

According to a preferred embodiment of the invention, the actual reading of each pixel at t=0, which is converted to a digital word by an A/D converter (numeral 16 in FIG. 1), is transferred to the output. Alternatively, the actual reading of each pixel may be output directly as an analog value. The autoscaling combination ($W_1, W_2, \ldots, W_W$) for that pixel, is stored in an external digital memory (numeral 15, in FIG. 1), or alternatively stored in an on-chip digital memory. This way, for each pixel, the actual reading is autoscaled in real time, according to the actual reset that is provided during the frame time. This reading may be expressed by a floating point representation, where the mantissa represents the actual reading from the A/D, and the exponent consists of the digital autoscaling combination ($W_1, W_2, \ldots, W_W$). The size of the memory 15, is $$\sum_{u=1}^{W} \frac{N}{2^u} * M,$$

since the first comparison ($W_1$) for the selected row (n) is carried out at row $$n - \frac{N}{2^1}$$

(which is shifted from row n by $$\frac{N}{2}$$

rows), whereas each row contains M pixels, and each pixel is scaled by a corresponding digital combination of W bits.

Alternatively, the W bit digital combination can be encoded and stored in the memory.

One of the main advantages of time-space multiplexing, presented in the present invention, is that by adding only one decision buffer 21, the integration time is controlled individually for each pixel, with adaptation to the illumination level, essentially without occupying space from the imager. Thus, there is almost no degradation in the resolution of the imager (less space results in a smaller number of pixels, and low resolution).

Looking back at FIG. 2, the frame time of a pixel array consists of N rows and M columns may be calculated. Readout of each row consists of a copying time, $T_{copy}$, which is the time it takes to copy one row into the readout buffer, and a scanning time, $T_{scan}$, which is the time it takes to scan each pixel. Since there are M pixels in each row, the total time, $T_{row}$, for row readout is given by:

$$T_{row} = T_{copy} + M * T_{scan} \quad [\text{Eq. 5}]$$

and the frame time T is given by:

$$T = N * T_{row} \quad [\text{Eq. 6}]$$

By adding W comparisons (for W different integration times) for each row, the row readout time is slightly modified and is given by:

$$T'_{row} = W*(T_{copy}+T_{comp})+T_{row} = W*(T_{copy}+T_{comp})+T_{copy}+M*T_{scan} \quad [\text{Eq. 7}]$$

where $T_{comp}$ is the time for comparison to the corresponding threshold level. Since normally W<<M (by several orders of magnitude), then $W*(T_{copy}+T_{comp}) << M*T_{scan}$ and $T'_{row} \approx T_{row}$. Hence, the frame time T, is insignificantly affected by autoscaling. This enables the imager to process scenes without degradation in the frame rate.

EXAMPLE 1

Looking again at FIG. 2, assuming that the imager 20 is exposed to a high illumination level, and consists of a square pixel array of 1024 rows and 1024 columns, it is desired to expand the dynamic range by 3 bits. In this case, W=3 and N=M=1024. Thus, for each pixel from the selected row n, three comparisons, $W_1$; $W_2$ and $W_3$ are carried out, at three time points, $$T - \frac{T}{2}, T - \frac{T}{4} \text{ and } T - \frac{T}{8},$$

respectively. The first comparison, with the first threshold, is carried out at row n−512 (512 rows before regular readout of that pixel), leaving an integration time of $$\frac{T}{2},$$

with a comparison result of $W_1$="1", this pixel is reset. The second comparison, with the second threshold, is carried out at row n−256 (256 rows before regular readout of that pixel), leaving an integration time of $$\frac{T}{4},$$

with a comparison result of $W_2$="1", this pixel is reset again. The third comparison, with the first threshold, is carried out at row n−128 (128 rows before regular readout of that pixel), leaving an integration time of $$\frac{T}{8},$$

with a comparison result of $W_3$="1", this pixel is reset again. The autoscaling combination for the pixel is 111 (=7 in a decimal representation) in this example, i.e., 7, whereas the autoscaling digital combination for a regular readout of a pixel, which is not reset during the same frame time, is 000 (=0 in a decimal representation). This means, that the pixel having an autoscaling of 111, has been reset 3 times during the frame time, and the regular readout for this pixel should be scaled (multiplied) by a factor of $2^3$=8. On the other hand, the pixel having an autoscaling of 000, has not been reset at all during the frame time, and the regular readout for this pixel should not be scaled. For no reset, the scaling factor is $2^0$=1, and the regular readout is taken as it is.

Of course, the above examples and description have been provided only for the purpose of illustration, and are not intended to limit the invention in any way. As will be appreciated by the skilled person, the invention can be carried out in a great variety of ways, such as constructing a pixel array with a number of rows and columns which is not an integer power of 2, employing more than one technique from those described above, carrying out comparisons after time intervals which are equal to each other or different from $$\frac{T}{2^W},$$

at row shifts which are equal to each other or different from $$\frac{N}{2^W},$$

all without exceeding the scope of the invention.

What is claimed is:

1. A method for expanding the dynamic range of an optical imager employing an array of pixels in rows, comprising:
   a) determining a threshold level for the signal that is output from a pixel, whereby a signal greater than said level indicates said pixel should be reset;
   b) determining the number W of comparisons to be made for each row of pixels, and time points for performing said comparisons, according to the required level of expansion;
   c) for each row that is selected for comparison, individually controlling the integration time of each pixel as a function of light intensity received thereon, by performing, at each time point, W comparisons of said signal to said threshold level and resetting said pixel whenever said threshold has been reached, wherein each comparison is performed at a row that is spaced by a specific number of rows from the selected row, which corresponds to another time point, and individually controlling the integration time of each pixel in the spaced row as a function of light intensity received thereon, by comparing the signal, in said spaced row, to said threshold level and resetting that pixel whenever said threshold has been reached;
   d) repeating step c) above for all rows in said array; and
   e) for each pixel, accumulating data representing the number of executed reset operations and providing a corresponding scaling factor for the electrical output of each said individual pixel, by using the accumulated data.

2. A method according to claim 1, comprising:
   a) providing a two-dimensional imager constructed from an active pixel array of integer M columns and integer N rows, fabricated on a semiconductor substrate, each individual pixel containing an optical sensor to receive light, a reset input and an electrical output representing the illumination received thereon;
   b) providing an upper column-parallel signal chain of M capacitors for copying the outputs of a selected row, thereby to compare said outputs to a set of corresponding threshold values;
   c) providing a lower column-parallel signal chain of M capacitors for copying the electrical readouts of each selected row;
   d) for each pixel, determining a threshold level, above which the pixel is reset;
   e) providing a digital memory, for storing the comparison results of the output of each pixel, with the set of threshold levels;
   f) providing a control circuit for controlling the reading operations of each pixel, the timing of said comparisons to a set of corresponding threshold values for each pixel, and corresponding reset signals for each pixel;
   g) determining the required expansion of the dynamic range by a series of W bits;
   h) determining a set of W time points, at which comparisons of each pixel output with the corresponding threshold vale is carried out, the intervals between any two consecutive comparison time points being prefixed;
   i) selecting a row (n) for readout;
   j) determining a set of row offsets $(\Delta_1, \Delta_2, \ldots, \Delta_W)$ between the selected row n and other row n−$\Delta_i$(i=1, 2, ..., W), said set of row offsets having W prefixed values;
   k) copying all pixel output values of the selected row n, into the lower capacitor chain, converting each one of said output values to a digital word and outputting said digital word;
   l) resetting row n;
   m) copying all pixel output values of row n−$\Delta_1$ into the upper capacitor chain;
   n) comparing the electrical output of each pixel in row n−$\Delta_1$ with a corresponding threshold value, at the time point which is matched to this row;
   o) outputting a series of M bits representing the comparison results of all pixel output values of row n−$\Delta_1$;
   p) storing the comparison results of step (o) above in the memory;
   q) applying a reset pulse for those pixels in row n−$\Delta_1$ that are expected to be saturated according to the stored comparison results;
   r) consecutively repeating steps (in) to (p) above W−1times, for all other remaining row offsets, at their matching time points, and applying a reset pulse for each pixel only if that pixel was reset in the preceding comparison time point;
   s) for each pixel from the selected row, obtaining and outputting the scaling factor, stored in the memory as a W bit digital combination, representing the ratio between the full integration time and the effective integration time of each pixel, from the set of W comparison results at each time point of step h) above;

t) for each pixel from the selected row, obtaining and outputting a digital word, which corresponds to the electrical output value of the pixel, at a timing of t=0; and u) repeating steps (l) to (t) above for all remaining rows of the pixel array.

3. A method according to claim 2, wherein the W bit digital combination is encoded and stored in the memory.

4. A method according to claim 2, wherein the intervals between any two consecutive comparison time points decrease according to a downgoing series.

5. A method according to claim 4, wherein the downgoing series is $$T - \frac{T}{X_1}, T - \frac{T}{X_2}, \ldots, T - \frac{T}{X_W},$$

wherein T represents the frame time for full integration, $X_1 > 1$ and $I = 1, 2, \ldots, W$.

6. A method according to claim 5, wherein the downgoing series is a geometric series.

7. A method according to claim 6, wherein the downgoing geometric series is $$T - \frac{T}{U^1}, T - \frac{T}{U^2}, \ldots, T - \frac{T}{U^W}$$

wherein $U > 1$.

8. A method according to claim 2, wherein the set of row offsets $(\Delta_1, \Delta_2, \ldots, \Delta_W)$ define a downgoing series.

9. A method according to claim 8, wherein the downgoing series of row offsets $(\Delta_1, \Delta_2, \ldots, \Delta_w)$ is constituted by the integer values of the downgoing series $$\frac{N}{X_1}, \frac{N}{X_2}, \ldots, \frac{N}{X_W}$$

where $X_i > 1$ and $i = 1, 2, \ldots, W$.

10. A method according to claim 8, wherein the downgoing series of row offsets $(\Delta_1, \Delta_2, \ldots, \Delta_w)$ is constituted by the integer values of the downgoing geometric series $$\frac{N}{U^1}, \frac{N}{U^2}, \ldots, \frac{N}{U^W}$$

wherein $U > 1$.

11. A method according to claim 10, wherein each row $n - \Delta_i$ is read at the time point $$T - \frac{T}{U^i} \ (i = 1, 2, \ldots, W).$$

12. A method according to claims 7, 10 or 11, wherein $U = 2$.

13. A method according to claim 2 wherein the electrical output values of each pixel are output directly as analog values.

14. A method according to claim 2 wherein the control circuit further comprises a conditional reset circuit, said conditional reset circuit carrying out the following operations:

a) generating a series of reset pulses of constant predetermined frequency and duty cycle by an external circuit;

b) generating a series of sampling pulses of predetermined duty cycle and of the same frequency of the reset pulses, by an external circuit, said series appearing with a constant delay with respect to the reset pulses, the time interval between consecutive sampling pulses representing the full integration time;

c) generating a series of reset enable pulses of time interval between consecutive pulses shorter than the time interval between consecutive reset pulses;

d) generating a control signal whenever the electrical output of a pixel exceeds the threshold value;

e) generating a conditional reset signal whenever there is coincidence between a reset enable pulse and a control signal;

f) starting integration at the time of generation of either a reset pulse or a conditional reset pulse; and g) terminating the integration at the time of sampling pulse generation.

15. A method according to claim 2, wherein the electrical output value of each pixel is represented as a floating point number, where the mantissa represents the regular value obtained from the pixel's analog to digital converter and the exponent represents the scaling factor.

16. A method according to claim 2, wherein the delay between the integration starting points of any consecutive rows is exploited for multiplexing between time and spatial domains.

17. A method according to claim 2, wherein the scaling of pixels within a frame time is carried out automatically during the frame time.

18. A method according to claim 2, wherein each pixel is an active pixel.

19. A method according to claim 2, wherein said optical sensor is a photodiode or phototransistor.

20. A method according to claim 2, wherein the number of rows and/or columns is an integer power of 2.

21. A method according to claim 2, wherein the control circuit and memory are external circuits.

22. A method according to claim 2, wherein the control circuit and memory are fabricated on the imager semiconductor substrate.

23. A method according to claim 2, wherein the pixel array is a square matrix with an identical number of rows and columns.

24. A method according to claim 2, wherein the lower column-parallel signal chain of capacitors is used for storing readouts for comparisons with threshold values, and the upper column-parallel signal chain of capacitors is used for copying the electrical readouts of each selected row.

25. A method according to claim 2, wherein the imager comprises only one column-parallel signal chain of capacitors with an associated A/D converter, which is used both for copying readouts for comparisons with threshold values and for copying the electrical readouts of each selected row.

26. A method according to claim 2, wherein comparisons are carried out by comparing to threshold levels, at at least several time points.

27. An optical imager employing an array of pixels and having expanded dynamic range, comprising:

a) means for selecting rows for comparison, with a threshold level for the signal that is output from a pixel, beyond which that pixel should be reset, said comparison occurring at predetermined time points according to a required level of expansion, the spacing between selected rows being related to said predetermined time points;

b) means for individually controlling the integration time of each pixel as a function of light intensity received thereon;

c) means for comparing said signal to said threshold level;

d) means for resetting each pixel whenever said threshold has been reached; and e) means for accumulating data representing the number of executed reset operations and for outputting a corresponding scaling factor for the electrical output of each said individual pixel by using the accumulated data.

28. An optical imager according to claim 27, comprising:

a) an active pixel array of integer M columns and integer N rows, fabricated on a semiconductor substrate, each individual pixel containing an optical sensor to receive light, a reset input and an electrical output representing the illumination received thereon;

b) an upper column-parallel signal chain of M capacitors for copying the outputs of a selected row, so as to compare said outputs to a set of corresponding threshold values;

c) a lower column-parallel signal chain of M capacitors for copying the electrical readouts of each selected row;

d) an array of analog to digital converters representing the electrical output of each pixel in a corresponding digital word;

e) a digital memory, for storing the comparison results of the output of each pixel with the threshold levels, and the digital words corresponding to the readout of each pixel;

f) a control circuit for controlling the reading operations of each pixel, the timing of comparisons for each pixel, and corresponding reset signals for each pixel;

g) means for selecting rows for readout;

h) means for copying all pixel output values of a selected row, into the lower capacitor chain;

i) means for converting each one of the output values to a digital word;

j) means for resetting the selected row;

k) means for copying all pixel output values of rows into the upper capacitor chain;

l) means for comparing the electrical output of each pixel in a row with a corresponding threshold value, at the time point which is matched to the selected row;

m) means for outputting a series of M bits representing the comparison results of all pixel output values of each row;

n) means for storing all comparison results in the memory;

o) means for applying a reset pulse for each pixel that is expected to be saturated according to the stored comparison results;

p) means for outputting the scaling factor, stored in the memory as a W bit digital combination or as an encoded combination of said W bits; and q) means for outputting the digital word, which corresponds to the electrical output value of the pixel, at a timing of t=0.

29. Optical imager according to claim 28, further comprising means for encoding the W bit digital combination.

30. Optical imager according to claim 28, wherein the control circuit comprises a circuit for generating conditional reset signals.

31. Optical imager according to claim 28, wherein the electrical output values of each pixel are output directly as analog values.

32. Optical imager according to claim 29, wherein the circuit for generating a conditional reset comprises:

a) means for generating a series of reset pulses of constant predetermined frequency and duty cycle by an external circuit;

b) means for generating a series of sampling pulses of predetermined duty cycle and of the same frequency of the reset pulses, by an external circuit, said series appearing with a constant delay with respect to the reset pulses, the time interval between consecutive sampling pulses representing the full integration time;

c) means for generating a series of reset enable pulses of time interval between consecutive pulses shorter than the time interval between consecutive reset pulses;

d) means for generating a control signal whenever the electrical output of a pixel exceeds the threshold value;

e) means for generating a conditional reset signal whenever there is coincidence between a reset enable pulse and a control signal;

f) circuitry for starting integration at the time of generation of either a reset pulse or a conditional reset pulse; and g) circuitry for terminating the integration at the time of sampling pulse generation.

33. Optical imager according to claim 28, wherein the electrical output value of each pixel is represented as a floating point number, where the mantissa represents the regular value obtained from the pixel's analog to digital converter and the exponent represents the scaling factor.

34. Optical imager according to claim 28, wherein the delay between the integration starting points of any consecutive rows is exploited for multiplexing between time and spatial domains.

35. Optical imager according to claim 28, wherein the scaling of pixels within a frame is carried out automatically during the frame time.

36. Optical imager according to claim 28, wherein each pixel is an active pixel.

37. Optical imager according to claim 28, wherein the optical sensor is a photodiode or phototransistor.

38. Optical imager according to claim 28, wherein the number of rows and/or columns is an integer power of 2.

39. Optical imager according to claim 28, wherein the accuracy of the scaling is substantially the same at any illumination level.

40. Optical imager according to claim 28, wherein the control circuit and memory are fabricated on the imager semiconductor substrate.

41. Optical imager according to claim 28, wherein the pixel array is a square matrix with an identical number of rows and columns.

42. Optical imager according to claim 28, wherein the lower column-parallel signal chain of capacitors is used for storing readouts for comparisons with threshold values, and the upper column-parallel signal chain of capacitors is used for copying the electrical readouts of each selected row.

43. Optical imager according to claim 28, wherein said imager comprises only one column-parallel signal chain of capacitors with the associated A/D converter, which is used both for copying readouts for comparisons with threshold values and for copying the electrical readouts of each selected row.

44. Optical imager according to claim 28, wherein comparisons are carried out by comparing to different threshold levels at at least several time points.

* * * * *

UNITED STATES PATENT AND TRADEMARK OFFICE
CERTIFICATE OF CORRECTION

PATENT NO. : 6,831,689 B2
DATED : December 14, 2004
INVENTOR(S) : Orly Yadid-Pecht, Theodor Morel Fishler and Salomone Antebi It is certified that error appears in the above-identified patent and that said Letters Patent is hereby corrected as shown below:

Column 12,
Line 61, delete "(in)" and insert therefor -- (m) --.

Signed and Sealed this

Eighth Day of March, 2005

JON W. DUDAS
*Director of the United States Patent and Trademark Office*